Feb. 2, 1932.                  W. SCOTT                    1,843,462
                                VALVE
                          Filed Oct. 2, 1930
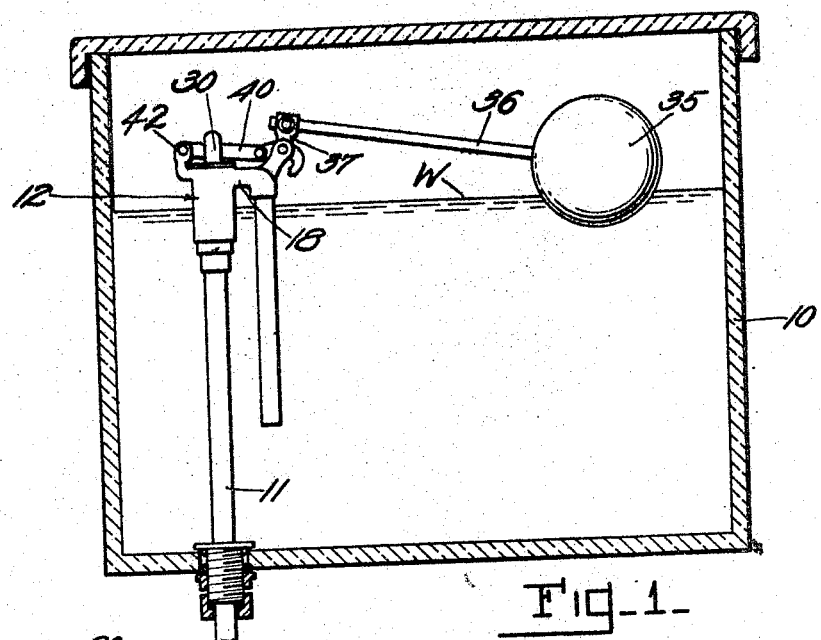
Fig-1-
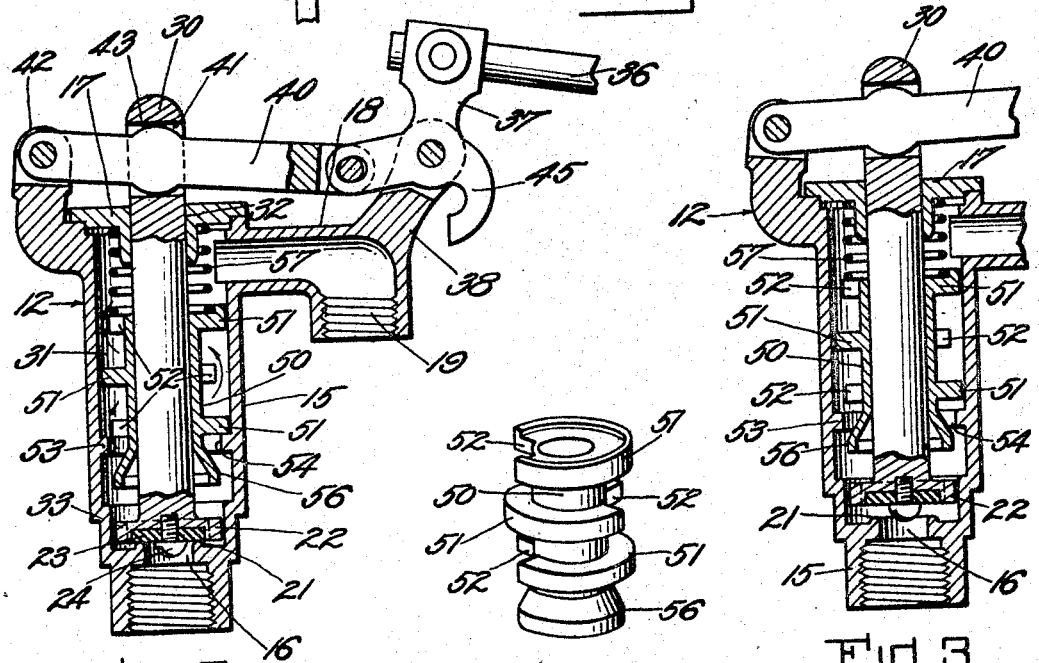
Fig-2-    Fig-4-    Fig-3-
INVENTOR:
William Scott
by Macleod, Calver, Copeland & Dike
                                Attys.

Patented Feb. 2, 1932

1,843,462

UNITED STATES PATENT OFFICE

WILLIAM SCOTT, OF MEDFORD, MASSACHUSETTS

VALVE

Application filed October 2, 1930. Serial No. 485,915.

This invention relates to valves and more particularly to ball cocks for controlling the supply of water maintained in a closet tank for flushing the bowl.

Such ball cocks operate automatically to open as the water level in the tank is lowered or to close when the water level is raised to a predetermined level. In the absence of special provision, ball cocks are noisy in operation. It has been attempted to overcome this difficulty by providing a restricted passage in the ball cock between the inlet and outlet. This arrangement was satisfactory as long as a given water pressure was maintained at the point at which the ball cock was located. It is usually impossible, however, to maintain a given pressure at this particular point because it is reduced by drawing water at points below. Consequently, if the bowl is used and flushed at a time when the pressure at the ball cock is low, the tank may not be refilled before it becomes necessary to use the bowl again.

It is the object of the present invention to overcome these difficulties and provide a substantially noiseless valve or ball cock in which a variable restriction is provided in the passage between the inlet and outlet and which is actuated automatically in response to the water pressure to reduce or increase the size of the restriction and thereby assure the proper supply of water to the tank at all times.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the claim hereto appended as considered in view of the prior art and the requirements thereof.

The invention will be more clearly understood from the following description in conjunction with the accompanying drawings: in which, Fig. 1 is a sectional elevational view of a tank, the inlet to which is provided with a ball cock embodying the invention;

Figs. 2 and 3 are sectional elevational views of a portion of the ball cock showing the relation of the parts when the ball cock is closed and open respectively; and Fig. 4 is a detail view of one of the parts of the ball cock.

The accompanying drawings show an apparatus illustrating one embodiment of the invention and comprises a tank 10 having an inlet pipe 11 controlled by a ball cock 12 embodying the invention. In the form illustrated the ball cock 12 comprises a hollow substantially cylindrical casing 15 having an inlet opening 16 at its lower end and enclosed at its upper end by a closure 17. The casing 15 is provided near its upper end with a branch 18 providing an outlet opening 19. A valve member 22 is provided with suitable packing 23 secured thereto, as by a screw 24, and adapted to engage an annular valve seat 21 surrounding the inlet. The valve member 22 is provided with a valve stem 30 extending longitudinally through the passage 31 in the casing 15 and through an opening 32 in the closure 17 which serves to guide the upper end of the valve stem as it is moved to open and close the valve. The valve member 22 is guided at its lower end by spaced radially extending projections 33 adapted to engage the inner wall of the casing 15.

The valve member 22 is moved inwardly to open the inlet and outwardly to close the inlet by suitable mechanism comprising a ball float 35 adapted to rest upon the surface of the water W in the tank 10. The float 35 is connected by a rod 36 to one end of a bell crank 37 pivotally mounted upon a lug 38 extending upwardly from the arm 18. The other end of the bell crank 37 is pivotally connected to one end of a lever 40 passing through an opening 41 near the upper end of the valve stem 30. The other end of the lever 40 is pivotally connected to a lug 42 extending upwardly from near the top of the casing 15. If desired, the lever 40 may be provided with an enlargement providing a curved surface 43 for engagement with the upper and lower walls of the opening 41. The bell crank 37 may be provided with a projection 45 adapted to engage the lug 38 and serve as a stop limiting the downward movement of the float 35 and, consequently, the upward movement of the valve member 22 with respect to its seat 21.

As illustrated, a muffler surrounds the valve stem 30 within the casing 15 and comprises a sleeve 50 surrounding the stem 30 and movable between the same and the casing 15. The sleeve 50 is provided with a plurality of spaced collars or baffles 51 extending into the passage 31 to substantially the inner wall of the casing 15. Each of the baffles 51 is provided with an opening 52 substantially equal in size to that of the inlet 16. The openings 52 are positioned in staggered relation with respect to each other, and in the form illustrated the openings in adjacent baffles are positioned adjacent diametrically opposite points on the sleeve 50. The lower baffles 51 is adapted to rest normally upon an annular projection 53 extending inwardly from the inner wall of the casing 15. This projection provides a restricted passage 54 within the casing between the inlet 16 and outlet 19. The lower end of the sleeve 50 is provided with an enlargement 56, preferably, of tapered form and positioned to be moved into and out of the restricted passage 54 in order to vary the size of the same. The enlargement 56 is normally held out of the passage 54 by a spring 57 surrounding the valve stem 30 with one end engaging the upper baffle 51 and the other end engaging the lower surface of the closure 17.

When the water level within the tank 10 is at the position shown in Fig. 1 the valve member 22 rests upon its seat 21 to close the inlet (Fig. 2). When the water level in the tank 10 is reduced, as by discharge for flushing the bowl, the float 35 descends and causes the valve member 22 to rise off its seat 21 and open the inlet 16. The pressure of the water against the lower end of the enlargement 56 of the muffler controls the position of the enlargement 56 with respect to the restricted passage 54. If the pressure of the water exceeds the compression of the spring 57, the enlargement 56 is moved into the passage 54 to reduce the area of the same and, consequently, reduce the flow through the ball cock. The velocity of flow through the cock is impeded by causing it to take a circuitous path around the sleeve 50 between the baffle 51 and through the openings 52. As a result the noise of the ball cock is materially reduced. Inasmuch as the size of the openings 52 are substantially the same as that of the inlet 16, a proper flow of water through the ball cock to the tank 10 is assured even at low pressure.

I claim:

A valve comprising a hollow casing having an inlet and an outlet, a valve member movable to open and close said inlet and having a valve stem extending toward said outlet, a member resiliently mounted between said stem and casing, said casing having an inwardly extending projection, said resilient member having a portion between said projection and said inlet adapted to cooperate with said projection to decrease progressively the size of the passage therebetween as the pressure of water flowing through said inlet increases, said resilient member being provided with spaced outwardly extending baffles between said projection and outlet.

In testimony whereof I affix my signature.

WILLIAM SCOTT.